(12) United States Patent
Faqih

(10) Patent No.: US 6,481,232 B2
(45) Date of Patent: Nov. 19, 2002

(54) APPARATUS AND METHOD FOR COOLING OF CLOSED SPACES AND PRODUCTION OF FRESHWATER FROM HOT HUMID AIR

(75) Inventor: Abdul-Rahman Abdul Faqih, Makkah (SA)

(73) Assignee: Fakieh Research & Development Center, Makkah (SA)

( * ) Notice: Subject to any disclaimer, the term of this patent is extended or adjusted under 35 U.S.C. 154(b) by 0 days.

(21) Appl. No.: 09/788,457

(22) Filed: Feb. 21, 2001

(65) Prior Publication Data

US 2002/0029580 A1 Mar. 14, 2002

Related U.S. Application Data

(63) Continuation of application No. 09/625,728, filed on Jul. 26, 2000.

(51) Int. Cl.$^7$ .................................... F25D 21/14
(52) U.S. Cl. .................. 62/291; 62/93; 62/285
(58) Field of Search .................. 62/291, 93, 285

(56) References Cited

U.S. PATENT DOCUMENTS

| | | | |
|---|---|---|---|
| 3,803,860 A | * | 4/1974 | Nagashima et al. ........... 62/58 |
| 3,816,266 A | * | 6/1974 | Izumi et al. .................. 203/11 |
| 3,882,692 A | * | 5/1975 | Watanabe et al. ............. 62/316 |
| 4,134,269 A | | 1/1979 | Arzet |
| 4,182,132 A | | 1/1980 | Nasser et al. |
| 4,313,312 A | | 2/1982 | Ito et al. |
| 5,106,512 A | * | 4/1992 | Reidy ........................ 210/744 |
| 5,149,446 A | * | 9/1992 | Reidy ........................ 210/744 |
| 5,203,989 A | * | 4/1993 | Reidy ........................ 210/137 |
| 5,553,459 A | * | 9/1996 | Harrison ....................... 62/93 |
| 5,845,504 A | * | 12/1998 | LeBleu ......................... 62/92 |

* cited by examiner

Primary Examiner—William C. Doerrler
Assistant Examiner—Mark Shulman
(74) Attorney, Agent, or Firm—Nixon Peabody LLP; Donald R. Studebaker

(57) ABSTRACT

Systems and methods are disclosed for the combined collection of freshwater from atmospheric humidity and cooling of closed spaces in hot and humid climates through collection and processing of water vapor condensate from air conditioning units and dehumidification and air-drying units. Components of air conditioning units are rearranged to allow outdoor air to go through the units to increase the condensate and hence freshwater production. Design modifications of dehumidifiers include separation of cooling and water condensation components from other components that radiate heat to enhance the cooling effects of dry air leaving the dehumidifiers. In addition, apparatus and methods are disclosed for adaptation of commercial dehumidifiers using gas refrigerants in providing ample freshwater quantities and comfortable space cooling. Those can replace window-mounted and wall-mounted air conditioning units as well as central ventilation and air conditioning systems, wherein refrigerant compressors and condensers are kept outside the building.

25 Claims, 7 Drawing Sheets

APPARATUS AND METHOD FOR COOLING OF CLOSED SPACES AND PRODUCTION OF FRESHWATER FROM HOT HUMID AIR

BACKGROUND OF THE INVENTION

1. Field of the Invention

The invention relates generally to providing comfortable climate in living quarters while providing freshwater from the atmosphere in regions suffering from freshwater shortage compounded with extended periods of extremely high temperature and very high humidity.

2. Summary of the Invention

Extreme heat in tropical and semi-tropical regions is usually accompanied by extremes of high humidity, especially at low altitude where bayous, marshlands, swamps, shallow lakes, heavy vegetations, and forests are abundant; tropical islands, such as the islands of the Caribbean Sea; arid land and deserts nearby oceans shorelines or seashores; such as the regions East of the red Sea and West of the Gulf on the Arabian Peninsula. Generally, natural freshwater resources are scarce or limited in very hot and humid arid areas by or near shorelines due to low precipitation and rainfall and high salinity of underground water.

Shortage in supply of potable water and freshwater is increasing at a vast rate as deserts expand and overtake fertile land and as many of the natural ground waterresources are being depleted. Shift in global weather patterns throughout time resulted in a drop in the rate of rainfall in many populated areas. In addition, large cities are expanding at a fast pace, swallowing neighboring villages and small towns, leading to drastic change in the lifestyle of inhabitants of regions of extreme high temperatures and humidity. With the shift from rural to urban lifestyle, people are forced to live in crowded housing and congested apartments with no or little opportunities to fresh air, thus suffering from stuffiness, heat and humidity, and being more exposed to an increasing shortage of freshwater supply.

Accordingly, there is a great need in most new residential developments in hot humid regions for easy access to sufficient freshwater supply as well as for means to cool and dry indoor atmosphere to a level that is barely adequate for leading a healthy and relatively comfortable existence in the dwellings of people with limited resources. Luckily, the lifestyle of people in most of the hot humid regions is such that residents do not require great reduction in temperature or humidity to lead a comfortable life in their housing or work environment.

Water condensation from humid hot air takes place as part of any air conditioning or air drying cycle employed in the wide spread commercial devices used in apartment buildings, residential homes, industrial facilities and commercial establishments. Usually the condensate from such devices drips out and is customarily disposed of as useless wastewater. Naturally, collection and treatment of the drained condensate can provide a continuous source of freshwater.

Air-drying equipment are of widespread use in cold regions to dehumidify air in basements that are commonly used for storage of fruit and perishable food products that do not require refrigeration and can be kept for long time in dry cool space. Dehumidifiers are also used in cold regions as well as hot humid regions in spaces used for storage of clothes and household furniture that can be affected by humidity and subsequent mold buildup. Air-drying equipment are also used in drying of manufacturing environment wherein wet raw material and stock material saturated with moisture for ease of production; such as the case in paper and wood fabrication. Often relatively dry air is required for maintenance of the quality of some products that may be affected by increase in humidity over a set level even for a short period.

The quantity of wastewater produced by dehumidifiers depends on the humidity of ambient air and could reach large quantities in regions of extremely high humidity and high temperature wherein water is usually scarce. In case of air conditioning equipment used for air-cooling and ventilation, the amount of water condensate depends on the capacity of equipment, the temperature setting inside and the temperature and relative humidity outside the building and accordingly the rate of condensation changes with the daily and seasonal variation of the local weather. In any case, air conditioning and dehumidification equipment produce on the long run substantial quantities of water when there is a need to cool or dry the air.

The onrush of vast developments of water vapor condensation, air conditioning and removal of humidity from air whether to maintain a comfortable living environment or for various industrial applications provide the possibility to produce high quality freshwater from ambient air of different humidity levels. Techniques to produce water by condensation of water vapor entrained in ambient air are expected to be economically competitive with traditional methods of production of water from other resources. For example, the effort to condense air humidity to obtain a specific quantity of water is much less than the effort to be expended in obtaining the same quantity of freshwater by desalination of seawater or underground brackish water.

People living in regions of high temperature and high humidity can resort to dehumidifiers to extract water from air while drying ambient air to maintain a comfortable living environment at their homes or work places. Hot and dry air is easier to tolerate since high humidity increases the heat index and the human sensation of hot weather. The dry air exhaust of dehumidifiers is less hot than ambient temperature if the equipment is modified to prevent heat pick up by dried air as it leaves the equipment.

Accordingly the possibility of combining freshwater production and easing of weather heat distress inside dwellings will increase the return from equipment that can condensate water vapor from ambient air specially in areas of extreme or relative deprivation from life necessities by supplying the residents with direly needed freshwater while providing them with some relief from the harsh weather. Coolness of the dwellings will provide inhabitants with physical comfort and reduce their need for water intake.

Additionally, there are many resorts and vacationing places in hot, humid regions deprived from drinking water and freshwater since they are spread in arid areas by shorelines wherein ground water is brackish and rainfall is rare. In spite of the popularity of these areas, construction of desalination plants to produce freshwater for tourists is not economical due to the briefness of the tourism season and decline of demand most of the year. Transportation of loads of freshwater is costly and exposes the water to contamination en route and during handling and storage. Reliance on bottled water is expensive for the average consumer while this source will not provide freshwater for other uses.

Accordingly, there is a compelling need for systems that can supply freshwater to cabins, camping areas and tourist areas while providing coolness indoors during tourism seasons in regions characterized by humid hot weather throughout.

Water quality in areas for which freshwater can be easily transported from water natural or man-made resources is often lower than the standards for drinking water quality due to exposure to contamination during handling, transport and storage in water tanks on top of buildings which forces the residents to use bottled water.

Accordingly, local water production from atmospheric humidity will reduce in the expenditure on drinking water and provide excess water for other human uses as long as the weather conditions are appropriate.

Prior art encompasses inventions that utilize chemical adsorbents to dry atmospheric air or moisture-laden gases. The moisture from air conditioning units is extracted as water for use whether as drinking water or fresh water after appropriate treatment. The adsorbent is regenerated and recycled for reuse. The use of adsorbents may be necessary in cases wherein insignificant amount of moisture is present in the atmosphere whereas in the case of extremely hot and humid environments the use of chemicals seems to be a nuisance and would require additional steps for extraction of water and regeneration of the chemicals.

3. Description of the Prior Art

U.S. Pat. No. 4,313,312, for example, discloses a water producing air conditioning system comprising a water producing apparatus that adsorbs moisture in the ambient air on an adsorbent or absorbent and evaporates water adsorbed on the adsorbent or absorbent by heating it and condenses steam to obtain water. A heat exchanger exchanges heat between ambient air and hot dry air discharged from the water producing system during adsorbing moisture on the adsorbent or absorbent. An evaporation-cooling system is used for forming a cold wet air by evaporating water and cooling it by contacting water with a dry air at the ambient temperature passed through the heat exchanger. The hot air heated by the heat exchanger or the cold air obtained from the evaporation-cooling system is utilized for the air conditioning. The system can be used for comfortable living in a severe condition such as a desert by the effective combination of the evaporation-cooling apparatus with the water-producing device utilizing high efficiency heat-exchange.

This aforementioned invention and others that may fall under the same category do not relate to the present invention since they are based on the use of adsorbents, desiccants and hygroscopic material, and mostly address hot low humidity climate conditions; which is not of concern to the present invention.

Heat pipes are used in some inventions to cool a condensing surface to dew point to precipitate the water vapor from the atmosphere. Heat pipes are also used to control indoor environment. However, the present invention is not based on this type of technology exploitation and inventions using heat pipes to cool condensing surfaces to dew point to precipitate the water vapor from the atmosphere or to cool closed spaces differ from the present invention in the use of heat pipes.

The prior art has also encompassed processes that rely upon heat convection in large structures and the control of the process to obtain freshwater from atmospheric humidity.

Tropical and subtropical regions having high ambient temperatures and relative humidity can be locally subjected to cooling and dehumidification according to U.S. Pat. No. 4,182,132, in which a tower, upon a post or other vertically extending support, and a pair of vertically aligned spaced apart air guides are provided. The lower air guide includes the cooler that can simultaneously condense moisture from the air while the upper air guide can include a heat dissipater of a refrigeration cycle. The air guides are associated with blowers and inducing ambient air into the air guide at a location between them and displacing the air through the air guides into heat exchanging relationship. The tower can also be used to collect potable (drinking) water by condensation from the atmosphere.

The above inventions that rely upon heat convection in large structures in extraction of freshwater from the atmosphere and cooling or dehumidification of local open space do not relate to the present invention, which is based upon processes that are performed within compact structures.

Domestic central air conditioning units used to cool homes or any other buildings operate in combination with air directing units that produce a quantity of waste condensate. The water formed by condensation taken out of the air was utilized in a lawn watering system that was disclosed in U.S. Pat. No. 4,134,269. A device is designed for continually collecting the waste condensate from the central air conditioning unit. The water is stored in a holding tank. At a predetermined level in the tank, a pump is switched on to deliver the water to a hose system in the lawn. The system intermittently and automatically distributes the condensate throughout a region to be irrigated. The device comprises: a holding tank for collecting the waste condensate; a drainage conduit for directing the waste condensate from the air conditioning unit to the holding tank; a depth sensing device is used indicating the level of the waste condensate collected in the tank; a pump that is automatically turned on by the depth sensing device to pump collected waste condensate from the holding tank when the depth sensing device indicates that the level of condensate in the tank has reached a predetermined maximum and automatically turned off by the depth sensing device when the depth sensing device indicates that the level of condensate in the tank has reached a predetermined minimum thus allowing the condensate to refill the tank to the predetermined maximum level; a discharge conduit associated with the pump; and an irrigation system for directing the waste condensate from the holding tank throughout the region to be irrigated.

None of the prior art references that benefit from condensation capabilities of air conditioning or dehumidification discloses modifications of those units that enhance cooling while increasing of freshwater output of the units by condensation of outdoor atmospheric humidity. Since the benefits drawn are restricted to the use of the condensate and drainage that come from the units, the use is limited to watering of flower or rose beds, lawns and similar limited applications.

Furthermore, none of the prior inventions discloses devices or means for utilization of the mild temperature dry air that exits after removal of humidity from ambient air, with the exception of air conditioning units where extracted water is a secondary product of the air conditioning process.

In addition, the present invention relies to a great extent on gravity in collection of condensate and in the flow of freshwater.

According to the present invention, freshwater and drinking water are produced by modification of commercial air conditioning units of different sizes and capacities; used to cool ambient air inside closed spaces and buildings, wherein the cooling cycle includes a stage for condensation of water vapor carried by the indoor and outdoor air surrounding the unit. In a second aspect of the invention, different embodiments are presented to utilize the coolness of dry air immediately following the heat exchange process leading to condensation of water vapor and reducing air temperature in modified dehumidifiers. In a third aspect of the invention, combined modified air conditioning units and modified dehumidifiers or double dehumidifiers are used to provide air cooling as well as freshwater supply.

In adaptation of air conditioning and ventilation units, design and construction of equipment for water production from condensate depend on the type of unit and the way it is used. There are three basic types of air conditioning systems. Window-mounted units fit in a standard window opening with adequate support, but without modification to the window structure. Larger units are to be mounted in an opening in a wall. The size is not constrained except by the width of the wall and the weight is only limited by the permissible loading of the supporting structure. Both units are used to cool a room or a limited space. The third type is central air conditioning systems that cool a whole house, an apartment or an office building. Those are split in a manner that allows placement of the heavy components outside the buildings and hence there is no limitation on their size, capacity or weight. In all three systems, collection of condensate from the drippings of the condensation of the water vapor entrained in the air to supply varying quantities of freshwater is possible. However, the amount of water condensate that can be obtained from air conditioning equipment used for air-cooling and ventilation depends on the capacity of the equipment, the temperature setting inside the building and the temperature and relative humidity outside the building. Accordingly, the rate of condensation changes with the daily and seasonal variation of the local weather.

Air conditioning units are operated on three modes, air-cooling, ventilation and a combination of air-cooling and ventilation. In the air-cooling mode, the air conditioning unit operates as a closed system that cools indoor air with minimal male-up air drawn from the outdoors air. Outdoor air is drawn inside the closed space to freshen the air circulation indoors. In some systems, air cooling continues while the unit is switched to ventilation and hence outdoor air is cooled as it enters the unit, however, the cooling will not be efficient since the flow of air is blown fast to the inside of the space without recycling to reduce the temperature and condensate the water vapor entrained in the air.

Air conditioning units produce water whenever used for air-cooling under all weather conditions. Nevertheless, production of freshwater from air conditioning units operating on the cooling mode before appropriate modifications are made is very limited; compared to water production from dehumidifiers, since in air conditioning units humidity and temperature are substantially reduced after short periods of air cooling, since the inside air is re-circulated without too much opportunity to draw makeup air from the outdoors hot humid ambient air. However, the re-circulated air often contains additional humidity from evaporation of moisture from human bodies, breathing, and human activities. In case of meeting-halls or crowded spaces, high humidity will be continuously generated. In case of homes, cooking and preparation of hot drinks increase the level of humidity inside closed spaces. In some situations, the humidity loading of the air conditioning unit from re-circulated air can be higher than that from makeup air or outside air in case of operation on ventilation mode.

Accordingly, specific modifications are necessary prior to using commercial air conditioning units in production of freshwater; including the addition of a condensation unit to condensate outdoor humidity; that is a refrigerant evaporator working continuously regardless of whether the air conditioning unit is operating in an air-cooling mode, air heating mode, ventilation mode or a combined air-cooling and ventilation mode. Furthermore, the condensate drippings from the unit has to be collected when it cools air drawn from outdoors or re-circulates indoors humid air. However, the exposure of indoor air to bacteria, dust, viruses, microbes, and harmful volatile organic particulates requires the use of filters and disinfectants before adding the condensate to the water produced by the additional condensation stage since the collected water will be used for drinking. On the other hand, collection of the drippings from the air conditioning unit for other uses may not require extensive treatment.

In case of window-mounted units, one of the aspects of the invention provides appropriate modifications compatible with the rectangular geometry of a unit fitted to a standard window opening. This requires that any additional equipment must be light and small so that their size can fit within the standard dimensions of window used in the regions of applications and their weight can be supported without changing in the structure of the window. Furthermore, window-mounted units are of limited capacity which makes it difficult to collect adequate quantity of condensate for production of sufficient freshwater that justify the expense of collection equipment, since the humidity of the indoors air will decrease after short time form the start of unit operation. Considering those limitations, this aspect of the invention provides a design encompassing the addition of an external condensation stage outside the window to condensate water vapor entrained in the outdoors hot humid air and a water treatment unit inside the building to be placed directly under the air conditioning unit.

In case of wall-mounted units, there is more room to introduce modifications adequate for utilization of the humidity from outside air and collection of condensate from cooling of inside air. In this situation, collection of larger supply of freshwater can be achieved. In addition, freshwater equipment can be connected to dispensers in kitchens; for example, or in any other place appropriate for using the product water to supply drinking water or freshwater for other uses such as cooking, washing, preparation of foods and drinks, etc.

Space limitations can be almost entirely overcome in case of utilization of central air conditioning units typically used in buildings and large houses. In this case, unit modifications may include placing equipment necessary for collection of condensate water outside the building proper. In addition, special water condensation equipment can be installed outside the house or building to include several coils and finned flat surfaces for condensation of large quantities of water from water vapor entrained in outdoor hot humid ambient air or the construction of special high efficiency circular condensation units with extended finned surfaces. Furthermore, the water purification units for treatment of water for human consumption can be an integral part of the water supply system for the building.

Naturally, there is a potential for using air conditioning units in cars or other land and sea vehicles to produce a limited quantity of drinking water or freshwater by collecting the condensate from such units. However, the quantity will be limited by the space available to add support units or modify existing units.

In other aspects of the invention, several embodiments of systems and methods benefit from the capabilities of dehumidification equipment in drying humid air by condensation of water vapor entrained in hot humid ambient air inside closed spaces, in space cooling and in extraction of humidity to supply freshwater to meet daily water demand for different uses including drinking. This has been accomplished by the present invention, through providing units that can be mounted on windows or in a wall opening or as a central system. In case of adaptation of central dehumidification systems, water condensation and collection is placed inside the building to provide water and coolness while other components are placed outside the building, such as the refrigerant compressor and condenser when using conventional refrigeration cycles, since such components require space and cooling. In space dehumidifiers, cooling of those components is usually achieved by blowing the produced dry cooler air over them after passing by the water condensation unit. This is why dry air from space dehumidifiers exits at high temperatures.

In these aspects of the invention, different refrigeration cycles are used to condensate water vapor carried by ambient air while cooling air indoors; specifically thermoacoustic cooling and thermoelectric cooling, which have several merits over conventional refrigerant cycles using CFC refrigerants. Equipment for these cycles occupy less space, do not require frequent replenishing of refrigerants and require minimal preventive maintenance compared to equipment using rotating equipment.

In a third aspect of the invention, combination of air conditioning units and dehumidification units is disclosed wherein modifications of these units allow efficient space cooling and production of freshwater. The indoor air cooling has the added benefits of using fresh outdoor air on continuous bases rather than circulating the indoor air with minimal make up air, leading to accumulation of pollutants in indoor air.

Accordingly, it is an object of the present invention to supply freshwater and treated drinking water in addition of air-cooling from air conditioning units of different sizes and capacities.

It is a second object of the present invention to modify air conditioning units; normally used in buildings of various living space areas and sizes to increase the production of water by condensation of outdoor humid hot ambient air during hot humid seasons.

It is a third object of the present invention to modify dehumidifiers and air dryers of different sizes to provide a comfortable level of coolness inside closed spaces while utilizing the condensated water vapor from hot humid air to produce freshwater.

It is a fourth object of the present invention to provide houses and buildings with systems to harvest freshwater for human consumption from hot humid ambient air while providing some moderate cooling inside without the need to transport water or acquiring it by external means and without the need for air conditioning units.

It is another object of the present invention to construct combined air cooling and air drying systems to efficiently cool indoor air while supplying fresh water for large buildings.

BRIEF DESCRIPTION OF THE DRAWINGS

FIG. 5b shows the components of production of freshwater of the system of FIG. 5a.

DETAILED DESCRIPTION OF THE INVENTION

Figure 1:
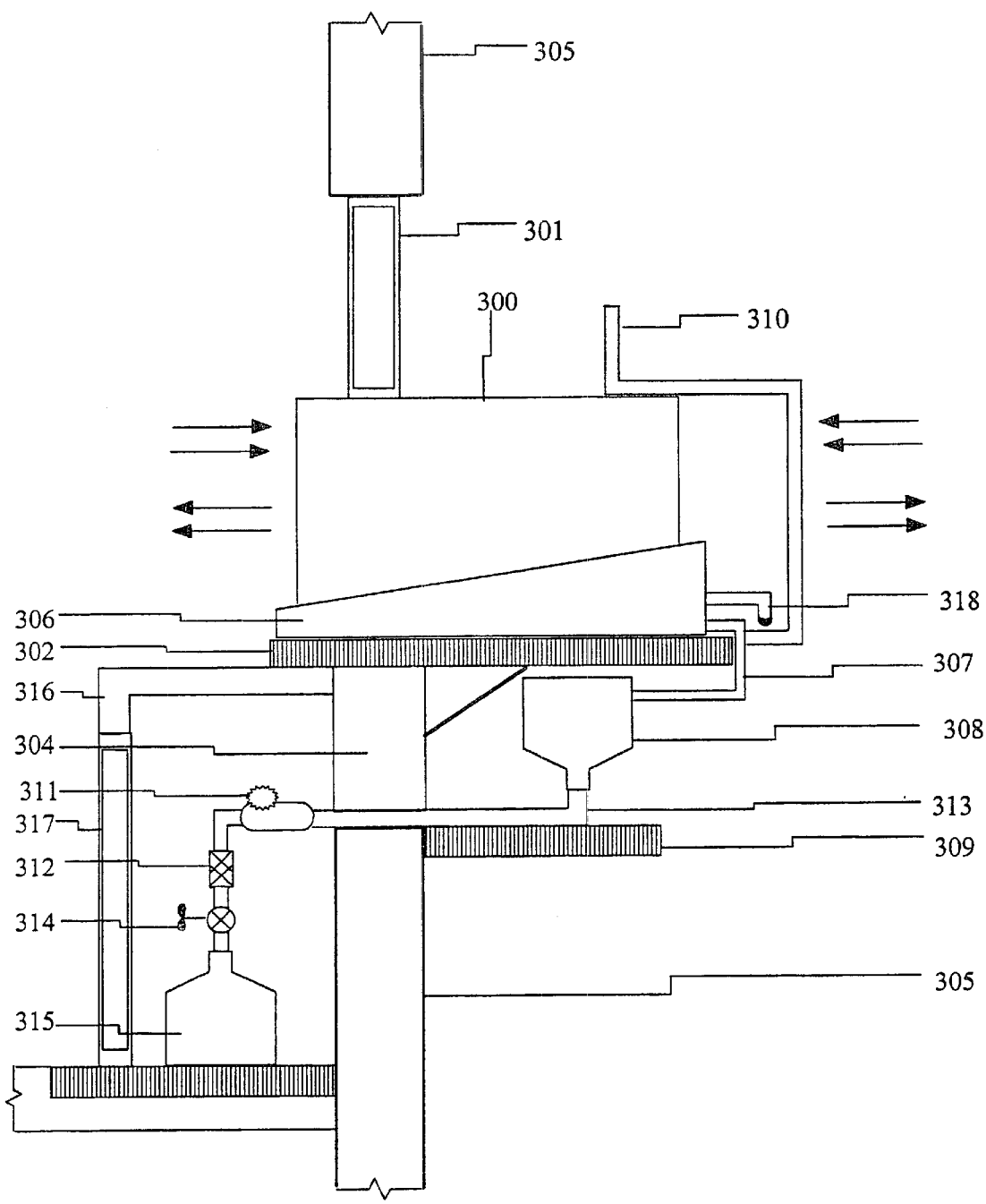
FIG. 1 schematically shows a simple system for production of a limited quantity of potable water; using a modified commercial air conditioning window-mounted unit for cooling of air inside a room or a closed space, wherein water flows completely by gravity and water is drawn directly to fill exchangeable bottles inside the premises.

FIG. 1 shows a side view of a simple small system for production of a limited quantity of drinking water from the condensate of humid air in a small window-mounted air conditioning (air cooling) unit; such as that produced by Fedders North America™ Effinggham, Ill.; Nordic Air Inc.™ Geneva, Ohio; Air Technology Systems, Inc.™ Frederick, Md.; or equivalent.

A unit 300 is installed on a window 301, in a position tilted to the outside of the building. Usually, the unit 300 is placed on a wooden base 302 to support its weight on the windowsill 304, built directly on a load-supporting wall 305, having a thickness of about 20 cm. The wooden base 302 is usually carried by supporting angle brackets fixed to the wall. Commonly window-mounted air conditioning units have a typical height of 44.5 cm and width ranging between 66 cm and 71 cm. Condensate from condensation of ambient air drips in a container 306 placed directly above the base 304 and under the unit 300 in a manner that prevents dripping of condensate outside the window as usually the case and retain the water within a container 306 that surrounds the unit with high sidewalls. Water is collected in the container 306 from humidity condensation flows through a narrow tubing 307 to a small holding tank 308 located outside the wall 305, under the level of the window 301, supported from the top by hinging to the base 302 and supported from the bottom by the wooden beam 309 firmly attached to the wall 305.

A venting tube 310 is connected to the tubing 307 to equalize and maintain ambient pressure within the system and prevent overflow of water in the container 306 without flowing down by gravity to the tank 308. The water flows from the tank 308 through the tube 313 to the disinfection unit 311 and then to the filter 312. The outlet of the filter 312 connects to a dispenser 314 that opens to fill exchangeable drinking water bottles 315 otherwise the dispenser 314 has to remain shut. The water treatment and supply components inside the space are contained in a cabinet or closet 316 with an opening or a door 317 to allow access to the components and changing the water bottles. The cabinet is located directly under the support 302 of the unit 300. To prevent overflow of condensate collected in container 306 inside the room a drain 318 is used to drain water in excess of the storage capacity of tank 308.

The disinfectant unit 311 comprises a small closed container wherein water is exposed to ultraviolet (UV) radiation emitted from a radiating UV source (lamp). The UV radiation is used to eliminate all microorganisms including germs that may enter the apparatus with the air and bacteria that may form in the water during condensation or may be present at the surfaces as water passes from the condenser to the container 306 and through the connecting tube 307. In addition, bacteria can get into the storage tank 308 and rapidly multiply. The potential is high for migration of microorganisms to the system in the presence of hot humid air especially in closed spaces wherein air makeup is limited. Ultraviolet sources are available commercially and commonly used for disinfection of water especially in medical applications wherein water has to be pyrogen free immediately before use. The UV source used in the implementation of the invention is Germ-Ex Ultra Violet Sterilizer™ manufactured by Aquacell International, Inc.™ or equivalent. Similar sources are produced by many companies including Watertech Enterprise™, Tai Pai, Taiwan; Trojan Technologies, Inc.™, Worcestershire, England, UK; or Brewster Water Purification™, British Columbia, Canada; or equivalent.

UV is effective in removal of microorganisms. The use of UV radiation in water disinfection has a similar effect as the addition of chlorine to municipal tap water; however UV radiation is less complicated and more effective for small amounts of water that are not held in storage for long time. For long-term storage of drinking water, continuous disinfection is necessary and hence chlorine or a continuous stream of ozone may be required.

The fact that both of the unit 300 and the container 306 are open to the atmosphere, the escape of volatile organic contaminants entrained in the air to the disinfection unit 311 and subsequent stages is unlikely. Such toxic particulates are usually present in air whether in a closed or open space.

In FIG. 1 the disinfected water flows by gravity to filter 312 for removal of any suspended fine dust, sand or metallic particulates and any disinfection byproducts. The filter 312 is a column combining active carbon and ion exchange resin. This type of filters is commonly used at offices and homes for purification of tap water for drinking, cooking or preparation of food and drinks, and as an extra measure of safety to the declining trust in the municipal water supply. In the implementation of this aspect of the invention, a Britta™ filter, or equivalent may be used. Among the commercial filters that can be used are those produced by Omni™, P ur™, and Rubber Maid™, USA.

After disinfection and filtration, product water flows by gravity to fill the drinking water bottle 315 through the dispenser 314. Alternately the water may be drawn directly from the dispenser to fill other types of containers such as jugs, cups or any household utensils.

The quantity of water to be drawn from the air conditioning unit 300 is limited by the fact that the relatively dry and cool air is circulated indoors without significant makeup from hot humid ambient air from the outdoors, unless the unit 300 is operated on a ventilation mode. In windowmounted air-cooling, units normally operate on two modes, one for cooling and the other for ventilation to freshen the air inside the closed space by admitting hot and humid outside air. In the cooling mode, air is drawn from inside the room through the inside front opening of the unit, by a fan. After passing by an air filter, the inside air-passes over a cold surface (refrigerant evaporator) to cool and dry the air and then the air returns to the room again through the same opening as cooler and dryer air. When the temperature of the atmosphere inside the closed space reaches a preset limit (detected by a thermostat that controls the operation of the air conditioning unit), the air conditioning unit is shut off until the temperature rises again over the set limit. If the temperature of the indoor atmosphere is set at a very low limit, the air is stripped entirely from moisture. Ice starts to form on the air filter due to drop in temperature and condensation of the vapor of the indoor air on its surface, turning on into ice as the temperature drops further. Water condensate freezes on the water condensation surface unless it is drained out. This will affect the performance of the air conditioning unit. In this case, the unit has to be turned-off until the ambient heat defrosts the ice. Alternately, the unit may be turned to ventilation mode to accelerate the defrosting process to improve the performance of the cooling unit when it is switched to air-cooling mode.

During the operation of the unit on the cooling mode, the quantity of condensate is reduced as the air-cooling process continues and the water vapor entrained in the air indoors diminishes, unless water vapor is generated inside the closed space from human activities. In the ventilation mode, hot humid ambient air rushes in from the outdoors passing by the cold condensing surface resulting in drying the air to a limited extent, determined by the residence time of the air in the vicinity of the cold surface and some water vapor will be condensated. Removal of moisture from the air will depend on the speed of flow of the air.

The quantity of condensate can be drastically increased if the windowmounted unit air inlet window is switched to ventilation, admitting outdoor air while the system is kept running to cool the indoor air. However, the load on the system will be high and the electric power consumption will drastically increase. Nevertheless, some air conditioning units are equipped with a controller to stop the flow of the refrigerant in the unit when the unit is switched on ventilation mode to save in consumption of electric power. Other units allow the rush of outside air in without passing over the condensation surface inside the air conditioning unit.

Figure 2:
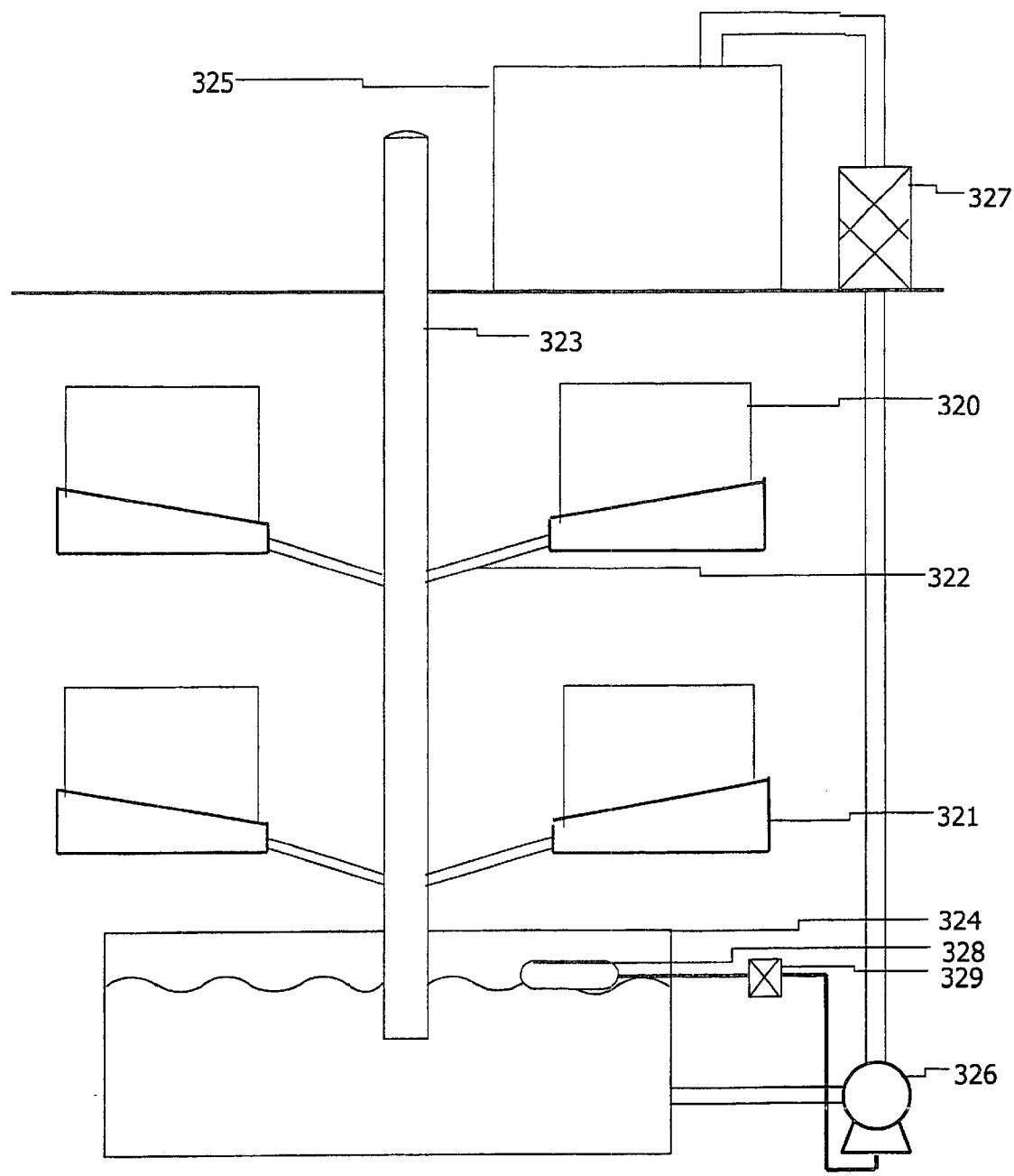
FIG. 2 shows a system for collection of condensate from several commercial air conditioning wall-mounted units to provide freshwater to an apartment building or office building from a storage tank on the roof.

In FIG. 2, an arrangement is provided for collection of condensate accumulating from condensation of moisture from the atmosphere by a plurality of wall-mounted air conditioning units in a multistory apartment or office building. The air conditioning units are similar to those produced by Koldwave Div.™ of Mestek™, Inc., Westfield, Mass.; Amana Appliances™, Amana, Iowa; Trane Co.™, La Crosse, Wis.; or equivalent.

The condensate is collected in a manner similar to that used in FIG. 1 for window units. In the system of FIG. 2, each unit 320 is provided with a container 321 to collect the condensate droplets. The water flows from the containers 321 by gravity through gutters or troughs 322 connected to a downward pipe 323 open to air from the top and draining water to a holding tank 324 atsthe ground level outside of the building. This arrangement can be used for production of either freshwater for general uses or drinking water.

Suspended dust or contaminants that may enter the water through collection and flow precipitate in the lower holding tank 324. To distribute the water to the users in the building, water is pumped by water pump 326 through filter 327 containing a mixture of resins and activated carbon to remove any fine dust or contaminants that may flow with the water. In case of providing drinking water, disinfection and filtration is required at the points of use in each office or apartment.

In order to control the pump 326 to avoid damage of the pump by cavitation, a float 328 is used to monitor the water level in the tank 324, to stop water pumping when the level goes below a set limit and starts to work when the level reaches a preset level.

The quantity of freshwater that can be obtained from the connected air conditioning units depends on the number of units, and the rate of condensate production of each unit. Generally the quantity is limited regardless of the capacity and number of units. The water product will not be sufficient to meet the demand of a building complex unless it is an office building with minimal water demand. The limitations come from the fact that water vapor condensation from the air slows down and may diminish, as the indoor air gets dryer and cooler unless the units are in ventilation mode or combined ventilation and cooling mode. If the wall units were replaced by dehumidification units, the production of water would increase on the expense of lower cooling output.

It is possible for the unit in FIG. 1 and the units of FIG. 2 to operate on the ventilation mode while continuing the operation of the refrigeration cycle by opening the vent windows while the cooling is in progress. This will produce larger quantity of condensate however; the cooling effect will be less and may make the living area uncomfortable at times of high temperature and high humidity. In addition, electric power consumption will be excessive to an extent that water production may be uneconomical. This is unless the units are modified such that sufficient water is produced without sacrificing the comfortable cooling level.

Figure 3:
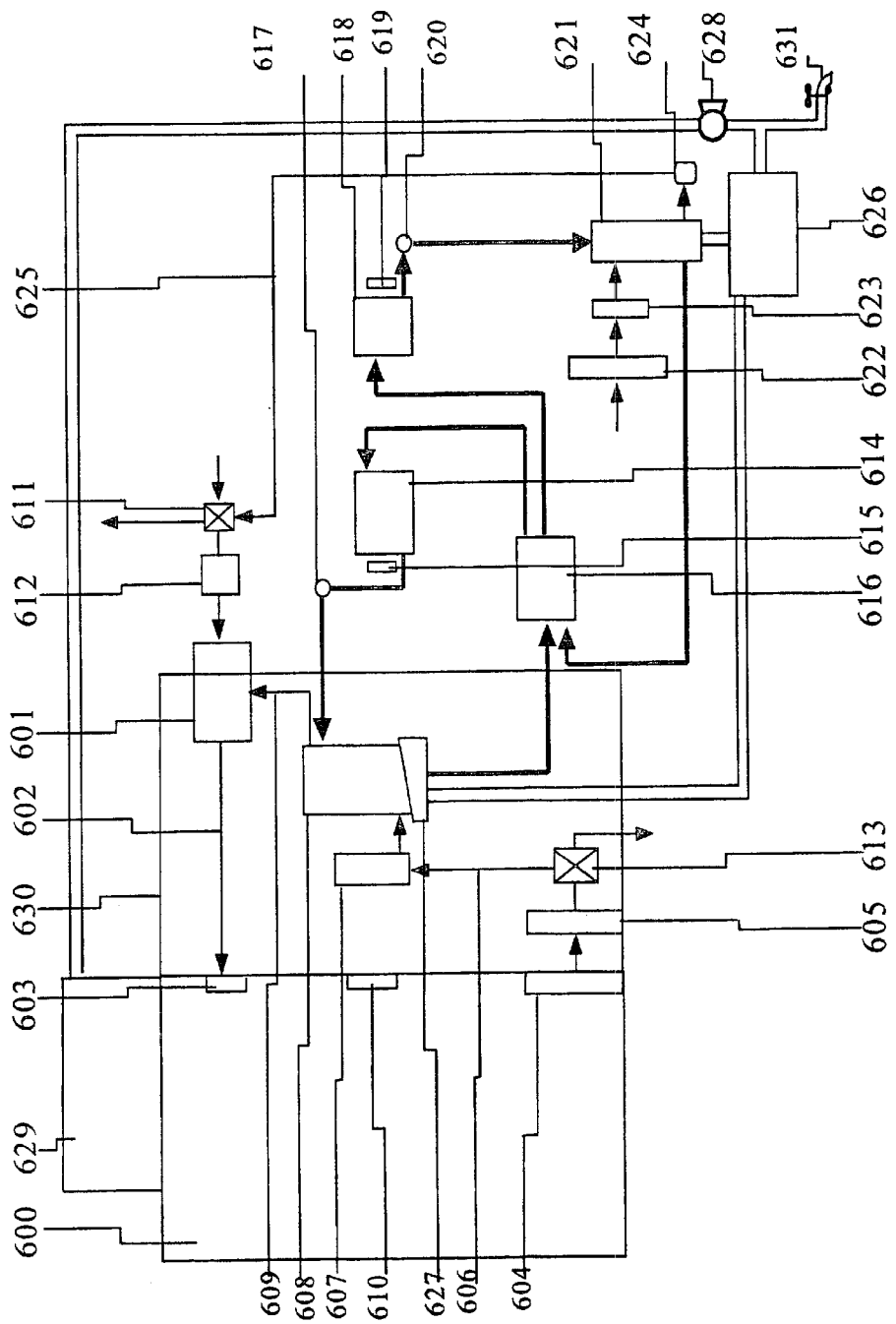
FIG. 3 displays a modified central air conditioning system to produce a large quantity of freshwater in addition to indoor air-cooling of a building.

In FIG. 3, extraction of water from air moisture is accomplished by modification of a central air conditioning unit, such as that produced by Amana Appliances™, Amana, Iowa; Trane Co.™, La Crosse, Wis.; Netmark Enterprises, Inc.™, Duncannon, Pa.; Carrier Corp.™, Syracuse, N.Y.; York International Corp.™,York, Pa.; or equivalent.

Such modifications may be introduced to a limited extent on window-mounted units as well as wall-mounted units especially split units wherein the refrigerant evaporator is placed inside the building whereas the compressor is kept outside the building to be cooled by a separate arrangement. Split-Ductless units are built by Mitsubishi Electronics America, Inc.™, HVAC Advanced Products Div.™, Norcross, Ga. or equivalent.

In the process of cooling the air of a building 600, cool-air is driven by a cold air blower 601 through a plurality of air distribution ducts 602 and rushed inside the space to be cooled via a plurality of air inlets 603 that can be adjusted to regulate the airflow in the ducts and distribute the cold air inside the building. During air-circulation within the building, the cooled air picks a load of heat and humidity from human activities inside the building. Return air exits through an air intake 604 after passing through an air filter 605 to remove smoke, fine dust, and any contaminants which are normally found indoor at homes, commercial offices, industrial facilities, and public buildings. Preferably, a HEPA filter is used to pick up fine particulates (in excess of 0.3 microns). Alternately static or negative ions filters may be used to efficiently remove contaminants and indoor pollutants. Return air is directed by air vanes 613 through return air ducts 606 driven by an air fan 607 to pass the consumed air in contact with the surfaces of the evaporator 608, wherein the exhaust air deposits its heat load and condensate its humidity load. Dry cooled air is directed back to the building by cold air directing vanes 607 with the aid of the air blower 601. The process continues until a set interior atmospheric temperature is reached. The interior temperature is regulated via a thermostat 610 that stops the air conditioning unit-from operation when the desired setting of the temperature is reached, and starts the operation when the temperature goes over the preset limit. Customarily, the air cooling components of the air conditioning unit are placed inside the building in a special compartment 630, whereas the balance of the equipment such as the refrigerant condenser 614 and the fan 615 that cools it and the refrigerant compressor 616 is placed outside the premises for protection of the residents or occupants from noise and potential refrigerant leakage, and to reduce the heat load on the moisture condenser 608 (refrigerant evaporator).

Ventilation is accomplished by the controller 610 that shuts off the evaporator 608 and opens the air inlet 611 to allow onrush of outdoor air inside the building. As the outdoor air is blown by the air fan 612 to the circulation blower 601, it enters from the vanes 603. After air circulation inside the space, the air returns through the intake 604 and the air filter 605 and escapes to outside of the building through the directing vanes 613. In the cooling mode, the vanes 613 direct air to the evaporator 608 preventing the air from escaping outside the building.

In the refrigeration-cycle, the refrigerant leaves the refrigerant condenser 614 as liquid under high pressure through the regulator 617 that regulates the flow of the refrigerant to the evaporator 608 (water vapor condenser) that picks up the heat and condenses the moisture from the hot humid air. The refrigerant evaporates and spread under low pressure to the dual compressor 616 where it is pressurized and returned back to the condenser.

To condensate atmospheric humidity, a water condensation cycle is added to the refrigeration cycle to produce freshwater from the water vapor in the air. The water vapor condensation cycle could be similar to the cycle used in the water vapor condensation cycle in air drying (dehumidification) equipment, wherein the dual compressor 616 compresses and pressurizes the refrigerant in its gaseous state and direct it to the condenser 618, which is cooled by the fan 619, to change the gas to a liquid state that flows to the regulator 620 and then to the evaporator 621, wherein the refrigerant extracts heat from the outdoor air and expands returning back to the compressor 616. The hot humid outdoor air enters the air filter 622 under the suction effect of the air fan 623. The air passes over the surface of the water vapor condenser 621 where it deposits the humidity burden and the heat load and exits under the effect of the air fan 624 that blows it through the air duct 625 to the vanes 611.

When inside air-makeup is needed or ventilation is required in the building 600, the vanes 611 direct cool dry air to the building 600 by the air fan 612 and distribution blower 601 through the inlet 603. Using dry cool air in ventilation of the building 600 reduces the heat load on the cooling cycle when it starts again and reduces power consumption.

The condensate produced by the water vapor condenser 621 drips in the holding tank 626 for temporary storage. In addition, the condensate collected from the evaporator 608 accumulates in the container 627 and then directed to the tank 626 whenever the container 627 is filled. The freshwater collected in the tank 626 is lifted by the water pump 628 to the water unit 629 on the roof of the building 600. Alternately the produced water may be used for irrigation, lawn watering or supplying drinking water for animals through the dispenser 613.

The freshwater is prepared in the water unit 629 for distribution in the building 600 whether as drinking water or as freshwater for other uses. Use of freshwater directly may require no or minimal filtration, since settlement of suspended particulates in the tank 626 and filtration of the air intake can reduce contamination. Drinking water preparation has to involve both disinfection and filtration.

The process of FIG. 3 can be applied to window-mounted units and wall-mounted units after modification of the process to reduce the size of the components to fit the small size applications. In this case, the tank 626 and the water unit 629 can be combined and placed in a kitchen or a terrace away from the air conditioning and water vapor condensation units.

Implementation of the process for window-mounted units may be difficult since the water vapor condensation unit will not be easily mounted outside the window under the air conditioning unit due to weight limitations. Doing so will require supporting angles and structure to lift a weight double the regular weight of the window-mounted unit. This will depend on the building structure. The case of the wall-mounted units will be easier to implement although the structure may cause difficulties in combining the air drying and air cooling processes in one unit while keeping them insulated and separate from each other to reduce the heat load.

In the invention aspect of the system shown in FIG. 3, water vapor condensation from humid and dry air may be achieved by using alternate technology to the refrigerant gases and liquids. That is, by eliminating the refrigerant condenser 618 and separation of the humidity condenser 621 from the compressor 616. In this case, cold water may be supplied to the humidity condenser 621 for cooling instead of the refrigerant if a source of cold water is available at location, such as brackish water from a deep underground aquifer or seawater. Piping, tanks, and pumps for handling saline water are state of the art. The design can be further simplified in buildings using cold water for cooling the building.

Alternative refrigeration technologies such as thermoelectric and thermo-acoustic refrigeration may be used in place of the conventional refrigerant cycle, especially in place of the water vapor condensation unit 621. The equipment based on these two cycles are characterized by a relative small size and light weight and have the advantage of absence of rotating mechanical equipment with the exception of the blowers and fans that drive the air in and out to pass by the condensation surfaces. This will allow the use of the process of FIG. 3 with any type of air conditioning unit, especially window-mounted units and wall-mounted units. Thermoelectric solid state air conditioning units have been produced by Melcor Corp.™, Trenton, N.J.; Electrografics International Corporation™, Warminster, Pa.; Thermoelectric Cooling America Corp.™ (TECA), Chicago, Ill.; or equivalent.

Figure 4:
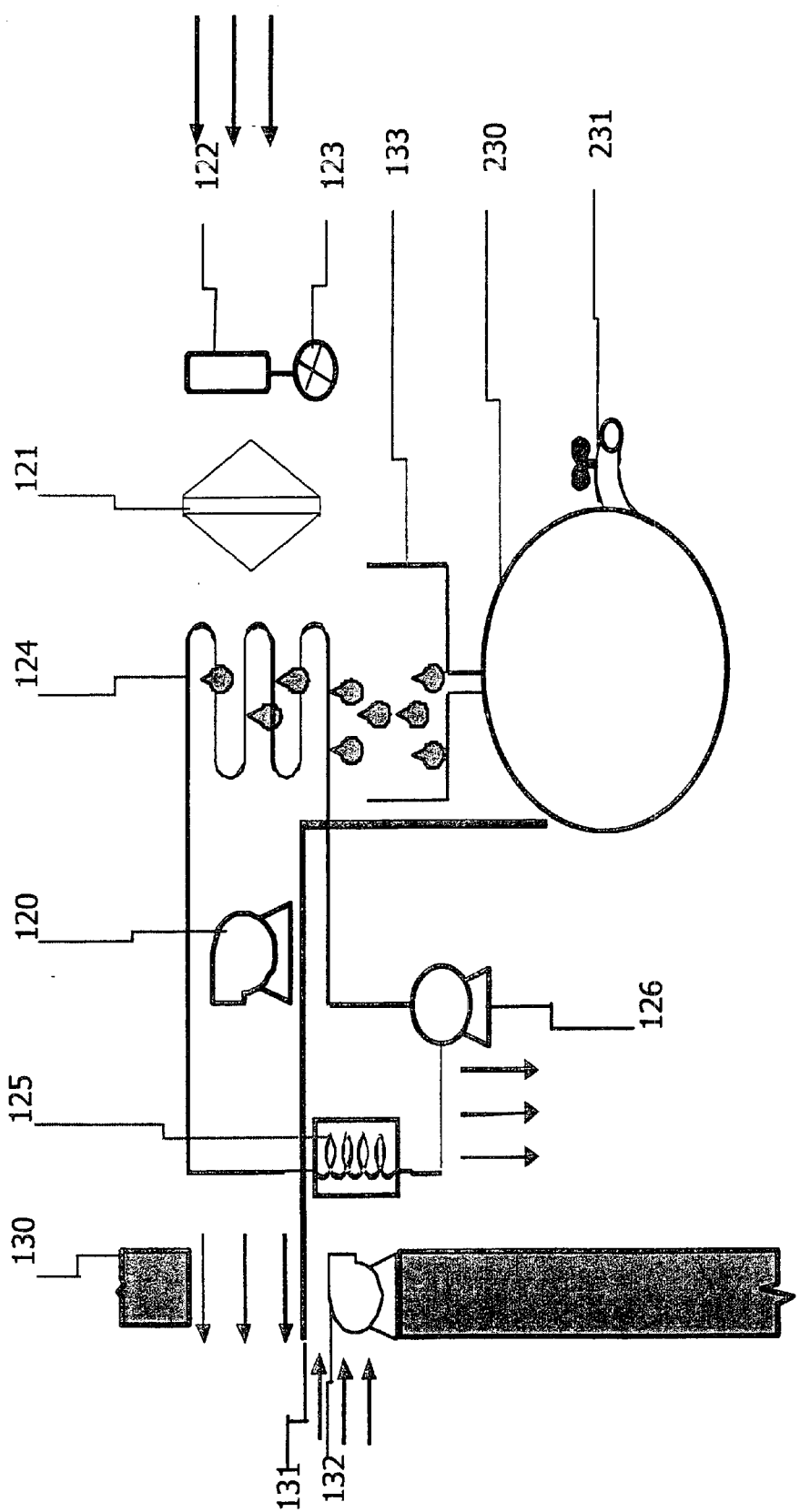
FIG. 4 shows the components of a small system for production of drinking water from humid hot ambient air using a modified commercial dehumidifier to provide cool air inside a closed space.

Although dehumidifiers and air dryers based on the use of refrigerants are designed for moisture or mist elimination, such devices can be modified for cooling a closed space such as room 130 of FIG. 4. The main modification involves complete isolation of the refrigerant evaporator (water vapor condenser) 124 from the refrigerant condenser 125 and the compressor 126. The thermal insulation 131 prevents any heat exchange between the dried and cooled air leaving the refrigerant evaporator (water vapor condenser) 124 after condensation of the water vapor and the heat generated by the refrigerant condenser 125 and the compressor 126. An air fan 132 is used to cool the refrigerant condenser 125 by drawing return air from the room 130. The room is then cooled by blowing the dry cold air while water vapor entrained in the outdoors hot humid ambient air is condensated by the refrigerant evaporator (water vapor condenser) 124 and the condensate is collected in a container 133. The water flows by gravity to the water unit 230, wherein it can be dispensed by a faucet 231 as freshwater or treated for use as drinking water.

In FIG. 4, the temperature and humidity sensor 122 placed at the intake of outdoor air disconnects the electric supply of the system by the circuit breaker 123 when the combination of indoor temperature and relative humidity drops below the comfort level inside the room and reconnects the unit when the limit is exceeded.

In FIG. 5, a system is shown for cooling a room, or a small home or office space while supplying freshwater from condensation of water vapor entrained in hot humid ambient air by a condensation unit similar to a window-mounted or a wall-mounted air conditioning unit. Accordingly, the whole system is designed and constructed to be a lightweight and small size for ease of mounting in a small opening in a building of modest structure. The system may be mounted in a window or a wall in the kitchen, for example, to collect the water at the center of use. The condensation cooling units are designed based on isolation and insulation of the refrigerant evaporator from the balance equipment of the refrigeration cycle.

Figure 5A:
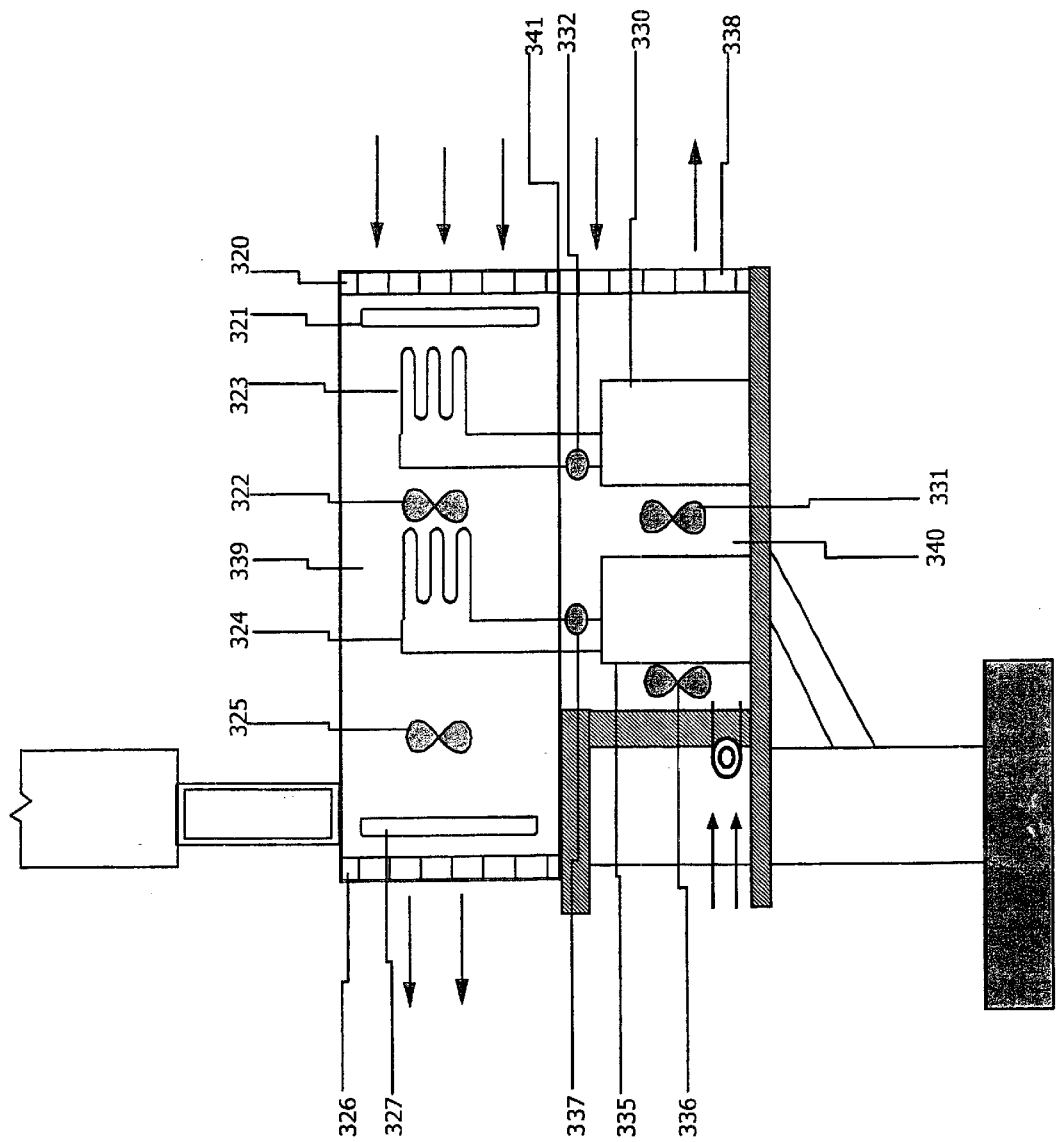
FIG. 5a shows the components of a system for cooling air inside a room or a closed space using dehumidification equipment for drying hot humid ambient air with simultaneous production of freshwater.

FIG. 5a shows a side view of the system showing the condensation and cooling equipment. The system comprises two stages of air drying and cooling wherein the refrigerant evaporators are insulated from the refrigerant condensers and compressors such that the generated heat will not affect the coolness of the air after drying and condensation of the entrained water vapor. In the first stage, the water vapor condensation surfaces 323 are supplied by liquid refrigerant from the unit 330, which is regulated by the regulator 332, and air cooled by the fan 331. In the second stage, the water vapor condensation surfaces 324 are supplied by liquid refrigerant from the unit 335, which is regulated by the regulator 337, and air cooled by the fan 336. The upper compartment 339 contains the water condensation surfaces 323 and the water condensation surfaces 324. The lower compartment 340 contains the unit 330 and the unit 335. Both compartments are thermally insulated by the insulator 341.

Outdoor hot humid ambient air enters the system from the inlet opening 320 by the suction effect of fan 322 through the air filter 321 to remove dust and other pollutants. Some of the entrained water vapor condensates over the surfaces 323 where both air humidity and temperature are reduced. The air continues to flow by the aid of fan 325 across the water vapor condensation surfaces 324 to unload the residual humidity and heat and enters the room as dry cool air from the opening inlet 326 after being filtered by the second air filter 327 to rid of any fine dust that may be present in the upper compartment 339 since the system is not sealed.

The refrigeration cycle support unit 330 and 335 are cooled by the air fans 331 and 336 consecutively, where air is drawn by the fans from the outdoor air through the screened back opening 338. The radiated heat in the lower compartment 340 may be used to heat freshwater in a water heater to dissipate some of the heat and provide the consumer with hot freshwater.

Figure 5B:
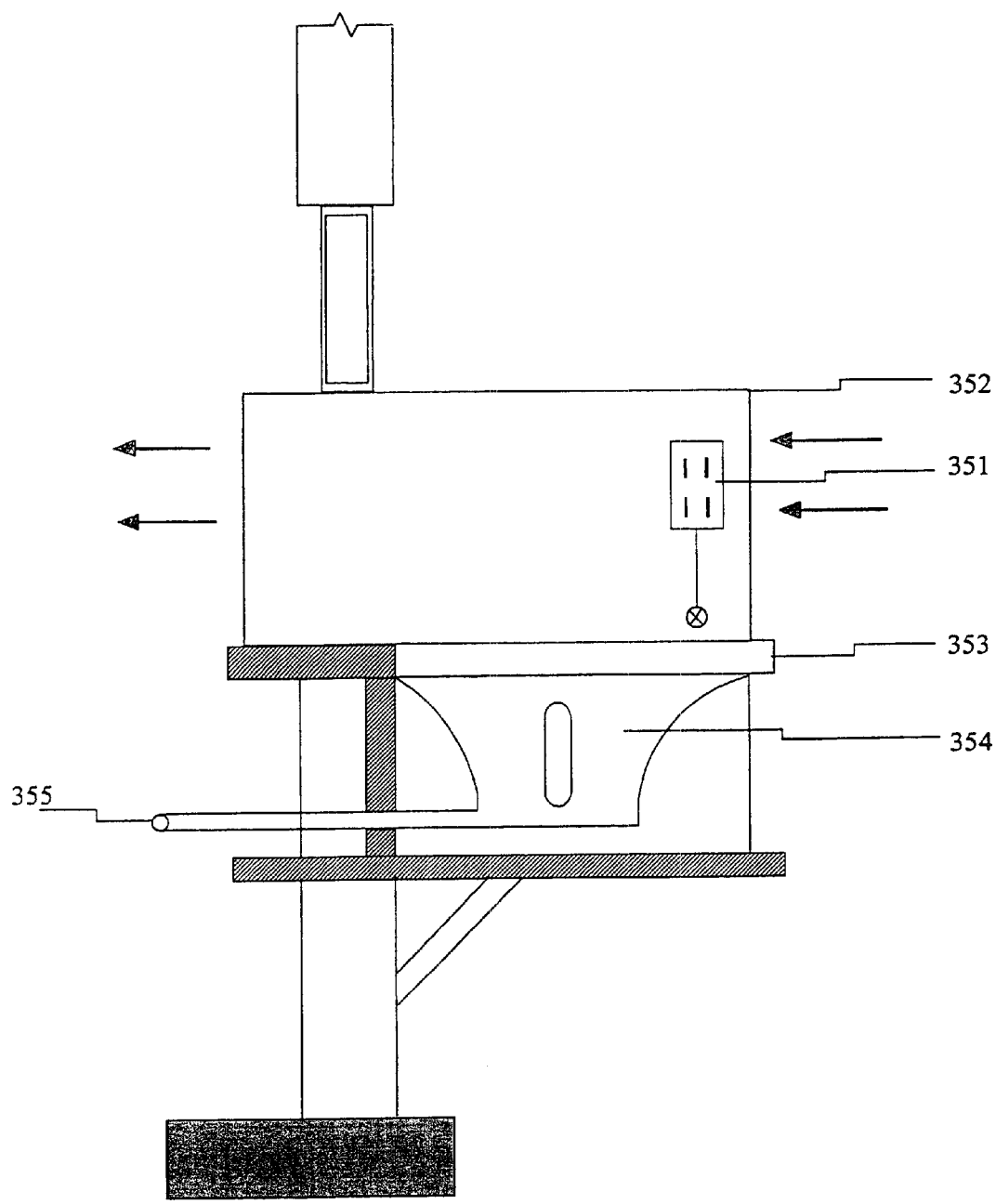

FIG. 5b shows the side view of the system displaying the water collection equipment that collect the condensate from the outdoor hot humid air. The temperature and humidity sensor 351, placed on the side of the box 352 disconnects the electric supply of the system when the temperature and humidity drops below the comfort level inside the room and connects it when a discomfort level is reached.

The product condensate is collected in a container 353 where the collected water falls by gravity to a storage tank 354 and the water is supplied to the house or office on demand by the dispenser 355. The container 353 extends under the water vapor condensers 323 and 324 above the separator 341 (FIG. 5a).

The arrangement shown in FIG. 5 is not presented for exclusion of other ways of arranging the components and is not limited to specific position, capacity, or connection methods but encompasses other implementation approaches.

The system and the process presented in FIG. 5 for a window-mounted unit can be easily adapted for a wall-mounted unit.

The merits of this aspect of the invention are the continuous use of fresh air without the need for indoor-air circulation, which has some health consequences. However, the level of cooling of the indoor air will not be as comfortable as the use of closed air conditioning units. Nevertheless, in areas of hot humid air and scarcity of water the comfort level may be adequate.

Figure 6:
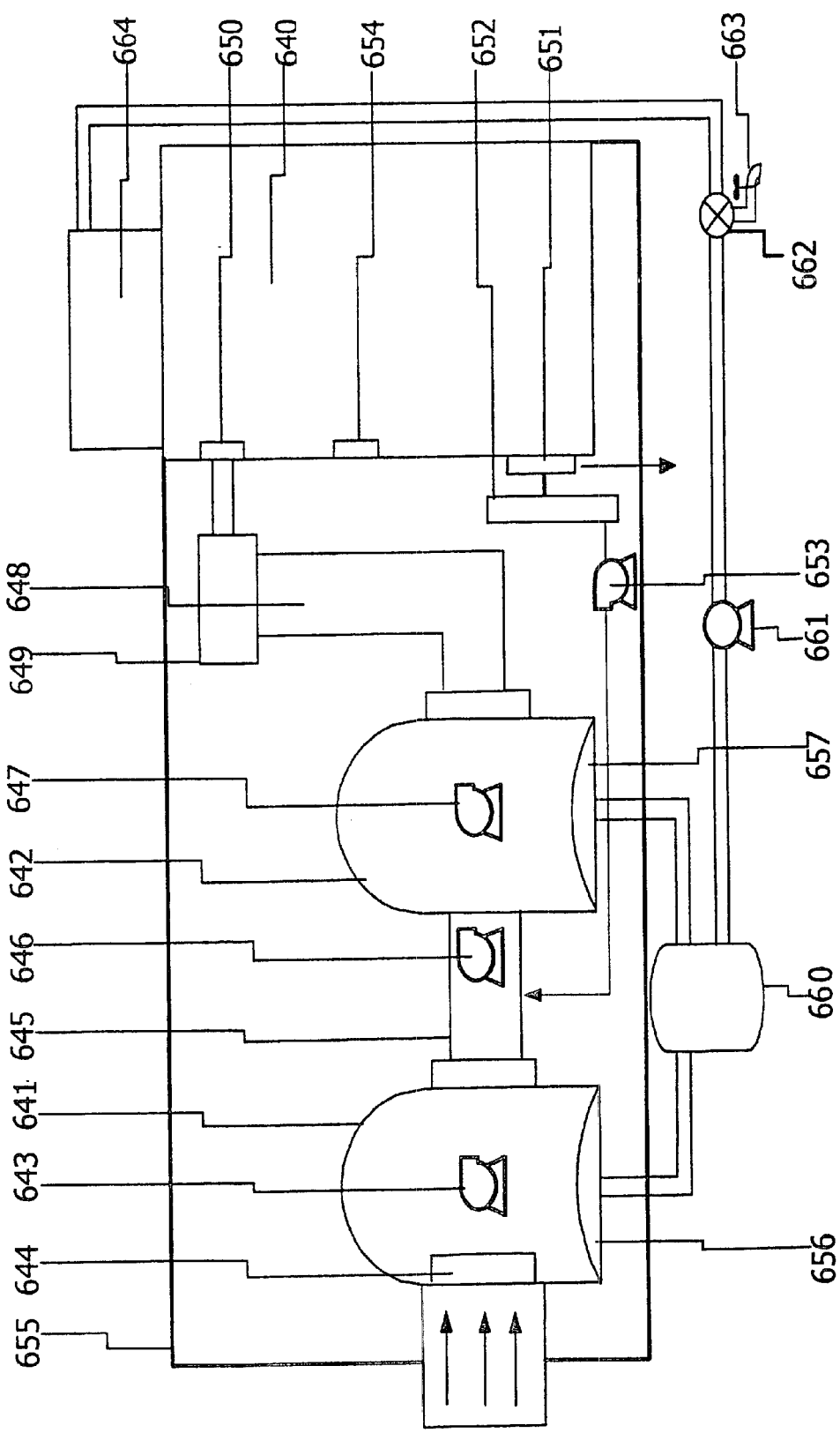
FIG. 6 presents a combination of modified central air conditioning and dehumidification units to produce large quantity of freshwater while cooling the air inside a building.

A process is shown in FIG. 6 for combining water production from atmospheric humidity with air-cooling in a large building wherein the process is similar to air-drying process without the use of air conditioning systems. However, the combined arrangement provides the building 640 with cool dry air to produce a comfortable level of central cooling from two air-drying stages 641 and 642 working consecutively.

Hot humid air enters the first stage of the air drying unit 641 by the action of the air fan 643 through the air filter 644 and exits after being dried with the action of the air fan 646 through the vanes 645 that direct the relatively dry air to the second stage air dryer 642 with the action of the air fan 647. Air fan 649 directs the cool dry air through the vanes 648 to the building through the distribution inlet 650. Return air leaves the building through the outlet opening 651, where air can be released to the outdoor atmosphere so that the air in the building 640 will be refreshed continuously. Alternately the exhaust air can be cleaned by the air filter 652 and directed through the vanes 645 with the aid of the air fan 653. This is the preferred way to assure adequate air-cooling to a comfortable level in hot regions. However, the selection between the two choices is accomplished by adjusting the controller 654 that controls the indoor temperature and the degree of air dryness to provide comfortable level in the building.

Maintenance of adequate level of indoor humidity inside the building is very critical to the comfort of the residents. Dry air can lead to health problems including nose bleeding and sinuses problems as well as dryness of the skin since the human body loses its moisture to the air by evaporation. On the other hand, high humidity intensifies the sensation of heat.

All the cooling and air-drying equipment are enclosed in the space 655. The equipment can be stacked vertically to reduce the footprint and minimize the space requirements.

The water recovery from the hot humid air proceeds by collecting the condensate from the air dryer 641 in the container 656 and directing the flow to a tank 660 when the container 656 is filled. Concurrently, the condensate from the air dryer 642 is collected in the container 657 and directed to the tank 660 which distributes the collected freshwater through the water pump 661 through the valve 662. The product freshwater can be dispensed through the faucet 663 or lifted to the storage water unit 664 on the top of the roof of the building wherein it can be treated for supply of drinking water or for distribution as freshwater for other uses.

The air dryers may use refrigerants. In this situation, the compartment 655 only contain the refrigerant evaporators that condensate water vapor and dry the air while the balance of the refrigeration cycle is kept outside the building proper.

Air drying and cooling may be achieved by pumping cold water to the water vapor condensation units providing a source of cold water is available at the location, specially in buildings using cold water for cooling the building. Alternative technologies for refrigeration such as thermoelectric and thermo-acoustic refrigeration may also be used.

While the present invention has been described with references to several embodiments, it will be appreciated by those skilled in the art that the invention may be practiced otherwise than as specifically described herein without departing from the spirit or the scope of invention. It is, therefore, to be understood that the spirit and scope of the invention be limited only by the appended claims.

What is claimed is:

1. A system for the production of a limited quantity of freshwater and drinking water by condensation of water vapor from high temperature, high humidity ambient air wherein water condensate flows therein by gravity without the aid of pumps or water lifts; said system comprising:
    a water vapor condensation means for condensing water vapor entrained in hot and humid ambient air, said air is flowing by natural air convection over and around said condensation means whether said air is circulating inside a closed space or fresh air blowing around in an open space surrounding said condensation means;
    an initial transportation means for transporting by gravity the condensate from said condensation means;
    a vent means for facilitating water flow in said system by gravity under ambient pressure;
    a water preparation means for preparing product water for drinking;
    a water distribution means for distributing drinking water from said water preparation means by gravity;
    a control means for controlling the operation of said condensation means; and
    an electric means for supplying electric power to said condensation means.

2. The system of claim 1, wherein said water vapor condensation means comprises:
    a window-mounted air conditioning unit that cools indoor air inside a room or a closed space using a refrigerant, wherein said indoor air is drawn to reduce its temperature and remove the humidity that may be entrained in said indoor air which is released from human activities within said closed space and returning the produced cooled and dried air through an air filter without drawing air from the outdoors, except from a very limited makeup air or when outdoor air enters during the ventilation mode;
    an open means to allow free falling of condensate droplets from said window-mounted air conditioning unit wherein said condensate droplets are produced by condensation of outdoor hot humid air when said air conditioning unit is operated on a ventilation mode and said indoor air during operation on cooling mode;
    a collecting means for receiving and collecting said condensate droplets from said open means by gravity;

a flowing means to allow the flow of water from said collecting means by gravity;

a storage means for storage of water flowing through said flowing means;

an overflow prevention means to dispose of water in excess of said storage means; and a control means to control said air conditioning unit.

3. The system of claim 2, wherein said control means comprises:

a circuit breaker means to interrupt the electric current supplying said air conditioning unit when the temperature inside said closed space is below the desired limit; and an actuating means to allow the operation of said air conditioning unit and shift the operation to ventilation mode by allowing outdoor air and circulating said outdoor hot humid air inside said closed space.

4. The system of claim 1, wherein said drinking water preparation means comprises:

a disinfection means for removal of microorganisms and biological contaminants from freshwater flowing by gravity from said initial transportation means;

an intermediate water transportation means to transfer disinfected water from said disinfection means; and a filtration means to remove suspended contaminants and particulates from disinfected freshwater and produce drinking water.

5. The system of claim 4, wherein said disinfection means comprises:

a disinfection chamber through which water flows by gravity from said collection means; and an ultraviolet source that emits continuous ultraviolet light to expose the water in said chamber to ultraviolet radiation to kill the microorganisms and oxidize the majority of organic contaminants present in the water.

6. The system of claim 4, wherein said filtration means comprises:

a filtration column comprising a mixture of activated carbon and ion exchange resin to clarify disinfected water from organic and inorganic particulates and oxidized waste flowing from said disinfection means and to improve water taste; and a third water transportation means to transfer filtered water by gravity.

7. The system of claim 1, wherein said drinking water distribution means comprises:

a faucet to provide the user with warm drinking water at ambient temperature on demand; and a filling means to fill bottles with drinking water on demand.

8. A system of recovering water from high temperature, high humidity ambient air to supply a large multi-story building with fresh water, comprising:

a plurality of commercial units based on a refrigeration cycle using a refrigerant, wherein each unit is cooling air inside of a specific space, wherein indoor air is drawn to reduce its temperature and remove the humidity that may be entrained in said indoor air, which is released from human activities within said closed space and returning the produced cooled and dried air through an air filter without drawing air from the outdoors, except from a very limited makeup air or when outdoor hot humid air enters during the ventilation mode;

an actuating means to allow the operation of said air conditioning unit and shift the operation to ventilation mode by allowing said outdoor hot humid air and circulating said outdoor hot humid air inside said closed space;

an open means to allow free falling of condensate droplets from said air conditioning unit wherein said condensate droplets are produced by condensation of said outdoor hot humid air when said air conditioning unit is operated on a ventilation mode and indoor air during operation on cooling mode;

a collecting means for receiving and collecting said condensate droplets from said open means by gravity;

a directing means to direct the freshwater collected in said collecting means from all said air conditioning units by gravity;

a total collecting means to collect freshwater from the plurality of said air conditioning units by gravity;

a holding means for temporary storage of water collected from said total collecting means and precipitation of contaminants suspended in the freshwater;

a lifting means to pump the water from said holding means to the top of said building;

a filtering means to remove suspended particulates in the freshwater;

a storage means to store the freshwater pumped to the roof of said building;

a distribution means to supply water to centers of use in said building of use by gravity; and a water treatment means to treat the freshwater at said centers of use in said building.

9. A process to increase the harvest of condensate from hot humid ambient air produced by a central air conditioning unit and a dehumidification unit in a building and drying of ventilation and make up air comprising:

collecting condensate drippings from said refrigerant evaporator in said central air conditioning unit;

directing collected condensate from said central air conditioning unit to a holding water storage tank by gravity;

blowing outdoor hot humid air in a unit for dehumidification using the dual refrigerant condenser of said central air conditioning unit;

filtering said outdoor hot humid air as it is blown in said dehumidification unit;

drying incoming said outdoor hot humid air by said dehumidification unit;

collecting condensate drippings from the refrigerant evaporator in said air dehumidification unit;

directing collected condensate from the said dehumidification unit to said holding water storage tank by gravity;

precipitating sediments in said holding water storage tank by gravity;

pumping accumulated plurality of freshwater product from said holding water storage tank to a general water storage tank on the roof top of said building;

drawing said plurality of freshwater product from said holding water storage tank to outside said building;

disinfecting said plurality of freshwater product in said general water storage tank to prevent buildup of bacteria;

filtering of said plurality of freshwater product while drawing it from said general water storage tank;

distribution said plurality of freshwater product from said general water storage tank to said building by gravity;

directing the relatively dry cool air from the exhaust of said dehumidification unit to said central air conditioning unit during the ventilation mode; and circulating said relatively dry cool air from the exhaust of said dehumidification unit in said building.

10. The process of claim 9, wherein the step of circulating relatively dry cool air comprises:

blowing said relatively dry cool air from the exhaust of said dehumidification unit for ventilation of said building;

blowing said relatively dry cool air from the exhaust of said dehumidification unit inside said building during the air cooling mode in lieu of re-circulating indoor air to said central air conditioning unit; and blowing return air from said building to said dehumidification unit for drying and dehumidification.

11. A system for producing and collecting freshwater from water vapor entrained in outdoor hot humid ambient air and cooling indoor ambient air inside a closed space, comprising:

a modified air conditioning unit to cool and dry said outdoor hot humid ambient air, cool and dry said indoor ambient air when operating on a cooling mode using a refrigeration cycle, and ventilate closed space when operating on a ventilation mode;

an isolation means to isolate said outdoor hot humid ambient air from said indoor ambient air;

an indoor air circulation means to circulate said indoor ambient air inside said closed space;

an outdoor air circulation means to direct said outdoor hot humid ambient air to inside said closed space;

a control means to control the startup and shut off operation and interruption of said modified air conditioning unit on demand;

a collection means to collect condensate from said evaporator and accumulate freshwater product;

a flow means to facilitate said freshwater product flow;

a storage means to store said freshwater product;

a freshwater preparation means to prepare said freshwater product for human consumption; and a distribution means of said freshwater product.

12. The system of claim 11, wherein said modified air conditioning unit comprises:

an air blower to draw said outdoor hot humid ambient air through a filtration means to filter said outdoor hot humid ambient air and blow said outdoor hot humid ambient air inside said modified air conditioning unit;

a evaporator for reducing the ambient temperature of said outdoor hot humid ambient air and for condensation of water vapor entrained in said outdoor hot humid ambient air by evaporation of a refrigerant, when said modified air conditioning unit is working on the cooling mode;

an evaporator regulator to control drying and cooling of said outdoor hot humid ambient air by said evaporator;

an upper compartment to contain said air blower, said air filtration means, evaporator regulator and said refrigerant evaporator;

a condenser to condense said refrigerant from said evaporator;

a compressor to compress said refrigerant;

a refrigerant regulator unit to regulate the flow of said refrigerant;

a fan to draw said indoor ambient air to cool said condenser and said evaporator;

a lower compartment to contain said condenser, said compressor; said refrigerant regulator, and said fan; and a thermal insulation means to thermally isolate said upper compartment and said lower compartment.

13. The system of claim 12, wherein said evaporator regulator comprises:

a sensor means to measure the temperature and relative humidity of said outdoor hot humid ambient air;

an absolute humidity measurement means to determine the absolute humidity of said outdoor hot humid ambient air from the readings of said sensor means; and an off and on switch to start up, shut off and interrupt operation of said refrigeration cycle according to the absolute humidity level determined by said absolute humidity measurement means.

14. A process for extracting freshwater water from water vapor in outdoor hot humid atmospheric air combined with cooling of indoor air inside a limited closed space using a modified refrigeration cycle, comprising:

drawing said outdoor hot humid air through an outdoor air inlet window of a compartment;

filtering said outdoor hot humid air as it enters said outdoor air inlet window;

directing said outdoor hot humid air through said compartment from said outdoor air inlet window;

measuring the temperature and relative humidity of said outdoor hot humid air at said outdoor air inlet window;

estimating the absolute humidity from measuring the temperature and relative humidity of said outdoor hot humid air at said outdoor air inlet window;

setting the comfort level of temperature and humidity in said limited closed space;

interrupting the operation of said modified refrigeration cycle according to setting the comfort level of temperature and relative humidity in said limited closed space;

re-activating the operation of said modified refrigeration cycle according to the setting of the comfort level of temperature and relative humidity in said limited closed space;

directing said outdoor hot humid air directly to the inside of said limited closed space for ventilation;

reducing the temperature and condensating water vapor from said outdoor hot humid air by said modified refrigeration cycle in said compartment to produce cool dry air;

directing said cool dry air directly to the inside of said limited closed space for cooling through an air outlet window;

circulating said cool dry air inside said limited closed space;

directing return air after circulating said cool dry air inside of said limited closed space through an air exhaust window to the outdoors;

insulating of the path of said cool dry air from the path of said return air;

cooling heat radiating equipment of said modified refrigeration cycle by said return air as it is directed through said air exhaust window to the outdoors;

collecting condensate from said modified refrigeration cycle as freshwater product;

facilitating the flow of collected said freshwater product;

storing of said freshwater product in a storage tank; and drawing water from said storage tank.

15. A system for cooling indoor air inside a building and obtaining water from atmospheric humidity in hot humid climate, using modified refrigeration cycle, said system comprising:

a separation means to isolate outdoor hot humid air from dry cool air inside said building;

a cooling and drying means to cool and dry said outdoor hot humid air;

a first containing means to house said cooling and drying means;

a refrigerant driving means to move refrigerants in said cooling and drying means;

a second containing means to house said driving means;

a thermal insulation means to insulate said first containing means from said second containing means;

an air blowing means to blow said cool dry air inside said building;

a distribution and dispersion means to circulate said cool dry air from said air blowing means inside said building;

a return means to return the consumed air from inside said building to said first containing means for cooling and drying;

an air makeup means to replenish indoor air from said outdoor humid hot air;

a ventilation means to circulate said outdoor humid hot air inside said building;

a coolness control means to adjust the temperature and humidity inside said building;

a collecting means to collect condensate from said cooling and drying means as a freshwater product;

a water flow control means to adjust the flow of said freshwater product inside said building; and a distribution means to distribute said freshwater product inside said building.

16. The system of claim 15, wherein said cooling and drying means comprises:

a first air blower to drive said outdoor humid hot air inside said first containing means;

an air dispersion means to disperse said outdoor humid hot air inside said first containing means to contact said cooling and drying means;

a first air filter to filter said outdoor humid hot air as it is blown by said first air blower inside said first containing means;

a first cooling and drying means to cool and dry said outdoor humid hot air after filtration by said first air filter;

a first cooling and drying means to cool and dry air leaving said first cooling and drying means;

a second air filter to filter air leaving said second cooling and drying means to produce cool and dry air; and a second air blower to blow said cool and dry air inside said building.

17. The system of claim 15, wherein said refrigerant driving means comprises:

a condensation, regulation and compression means to supply refrigerant to said cooling and drying means;

a return air drawing means to draw indoor air consumed inside said building to cool said refrigerant driving means;

an outdoor air drawing means to draw said outdoor humid hot air to cool said refrigerant driving means; and an air exhaust means to drive hot air exhaust after cooling said refrigerant driving means.

18. The system of claim 15, wherein said coolness control means comprises:

a sensor means to measure the temperature and relative humidity of said outdoor humid hot air;

an absolute humidity measurement means to determine the absolute humidity of outdoor humid hot air from the readings of said sensor means; and an off and on switch to start up, shut off and interrupt operation of said refrigeration cycle according to the absolute humidity level determined by said absolute humidity measurement means;

a control means to adjust the coolness and dryness of indoor air; and a directing means to bring said outdoor hot humid air directly to the inside of said building for ventilation.

19. The system of claim 15, wherein said water flow control means comprises:

a directing means to direct the freshwater collected in said collecting means;

a storage means to store freshwater directed by said directing means;

a holding means for precipitation of contaminants suspended in the freshwater;

a filtration means to filter freshwater;

a preparation means to prepare freshwater for consumption; and a driving means to move freshwater to said distribution means.

20. A process for combined cooling indoor air inside a building and collection of water vapor from outdoor hot humid air using a modified refrigeration cycle, said process comprising the steps of:

filtering said outdoor hot humid air entering a cooling and condensating unit;

drawing of said outdoor hot humid air inside said cooling and condensating unit;

forming and directing a unidirectional stream of said outdoor hot humid air to intimate contact with said cooling and condensating unit;

lowering the temperature of directed outdoor hot humid air by heat transfer with cold coils and finned surfaces and condensating water vapor entrained in said outdoor hot humid air to produce cooler dryer air and condensating said water vapor;

additional driving and directing of said cooler dryer air to intimate contact with said cooling and condensating unit;

further lowering of the temperature of said directed cooler dryer air by heat transfer with cold coils and finned surfaces and condensating water vapor entrained in said outdoor hot humid air to produce cool dry air and condensating of residual water vapor;

filtering of dry air exiting from the outlet of said cooling and condensating unit;

driving cold dry air from said outlet of said cooling and condensating unit to the air inlet of said building;

distributing and circulating said cold dry air inside said building;

regulating the degree of coolness and dryness of circulating air inside said building;

exiting indoor air exhaust after loading with indoor generated heat and humidity;

insulating the path of said cold dry air entering said building from the path of exhaust air leaving said building;

directing said indoor air exhaust for cooling of equipment delivering refrigerant to said cooling and condensating unit;

directing said outdoor hot humid air for cooling of said equipment delivering refrigerant to said cooling and condensating unit;

directing of air cooling said equipment delivering refrigerant to said cooling and condensating unit to outside said building;

driving said indoor air exhaust to outside said building;

collecting condensate from said cooling and condensating unit to accumulate freshwater product;

driving said freshwater product to the inside of said building;

storing said freshwater product in a tank inside said building;

disinfecting said freshwater product inside said tank;

filtering disinfected freshwater product; and drawing of drinking water for consumption.

21. A system for cooling of indoor-air in a building and production of freshwater by collection of condensates from water vapor entrained in hot humid air, using combined air conditioning cycle and dehumidification cycle, said system comprising:

an air cleaning means to filter outdoor humid hot ambient air;

a preliminary means to cool and dry clean outdoor humid hot ambient air;

a drawing means to drag said clean outdoor humid hot ambient air through the inlet of said cooling and drying preliminary means;

a blowing means to move relatively cooler and dryer air from the outlet of said cooling and drying preliminary means;

an additional means to cool and dry said relatively cooler and dryer air;

a directing means to move said relatively cooler and dryer air blown from said outlet of said cooling and drying preliminary means to the inlet of said additional means to cool and dry said relatively cooler and dryer air;

a second blowing means to move said relatively cooler and dryer air through said inlet inside said additional means to cool and dry said relatively cooler and dryer air for additional cooling and drying;

a distribution means to distribute cool and dry air inside said building;

a blowing means to force said cool and dry air from said additional cooling and drying means to said distribution means;

a circulation means to circulate said cool and dry air from said distribution means;

a regulation means to regulate air cooling and drying of indoor air of said building;

an exiting means to exhaust consumed indoor air of said building;

an air filter means to clean said exhaust consumed indoor air of said building;

a blowing means to drive said exhaust consumed indoor air to said directing means that moves said relatively cooler and dryer air blown from said outlet of said cooling and drying preliminary means to the inlet of said additional means;

a holding tank to store accumulated freshwater product and precipitate sediments contained therein;

a first collecting means to collect condensate from said cooling and drying preliminary means;

a water flow means to direct condensate from said cooling and drying preliminary means to said holding tank;

a second collecting means to collect condensate from said cooling and drying additional means;

a second water flow means to direct condensate from said cooling and drying additional means to said holding tank;

a water storage means located on the top of the roof of said building to distribute fresh water;

a lifting means to pump freshwater from said holding tank to said water storage means; and a water dispensing means to draw freshwater from said holding tank to the outside of said building.

22. The system of claim 21, wherein said cooling and drying means comprises:

a refrigerant evaporator coils and finned condensation surfaces; and an insulation means to insulate said refrigerant evaporator from balance of refrigeration cycle equipment that radiate heat.

23. The system of claim 21, wherein said cooling and drying means comprises:

a thermoelectric cooler;

a plurality of coils and finned condensation surfaces cooled by water; and an insulation means to insulate said coils and finned condensation surfaces from any components that radiate heat.

24. The system of claim 21, wherein said cooling and drying means comprises:

a thermo-acoustic refrigeration unit;

a plurality of coils and finned condensation surfaces cooled by water; and an insulation means to insulate said coils and finned condensation surfaces from any components that radiate heat.

25. The system of claim 21, wherein said cooling and drying means comprises:

a cold water supply means; and a plurality of coils and finned condensation surfaces cooled by water.

* * * * *